United States Patent [19]

Cowpland et al.

[11] 4,273,965
[45] Jun. 16, 1981

[54] TONE DECODING CIRCUIT

[75] Inventors: Michael C. J. Cowpland, Ottawa; Patrick R. Beirne, Stittsville, both of Canada

[73] Assignee: Mitel Corporation, Kanata, Canada

[21] Appl. No.: 23,999

[22] Filed: Mar. 26, 1979

[30] Foreign Application Priority Data

Oct. 6, 1978 [CA] Canada ................................. 312903

[51] Int. Cl.³ .......................................... H04M 1/50
[52] U.S. Cl. ................................ 179/84 VF; 328/138
[58] Field of Search ............. 179/84 VF; 340/171 R; 328/138, 139, 140

[56] References Cited

U.S. PATENT DOCUMENTS 3,780,230 12/1973 Bowen et al. .................. 179/84 VF
3,806,664 4/1974 Bowen et al. .................. 179/84 VF Primary Examiner—Joseph A. Popek
Attorney, Agent, or Firm—Alan H. Levine

[57] ABSTRACT

A multifrequency dialing tone to 2/8 decoding circuit which does not require individual filters for distinguishing individual tone frequencies. The circuit converts the period of each of the received multifrequency signals to individual voltage amplitudes which corresponds thereto, then compares the voltage amplitudes with a predetermined plurality of voltage ranges. Correspondence of a voltage amplitude level with one of the ranges causes production of an output signal, signifying the presence of a particular acceptable multifrequency tone. Individual correspondence signals operate latches which apply signals to decode leads which carry the decoded output signal.

11 Claims, 7 Drawing Figures

TONE DECODING CIRCUIT

This invention relates to a decoding circuit which is particularly useful for decoding multifrequency dialing signals used on telephone lines.

BACKGROUND TO THE INVENTION

Dialed multifrequency signals normally consist of two simultaneous tones, one of a group of high frequency tones, and one of a group of low frequency tones. The individual tones are required to be decoded in twos, whereby the required dialed digit may be distinguished. Decoding has in the past required distinguishing the tone frequency components by filtering. In the event the received signals did not fall within the filter bandwidths, they were not decoded.

To provide accurate decoding, the filters used to distinguish the various frequency tones must be of narrow bandwidth in order that extraneous noise signals would not be translated as tone signals. Further, the filters must be accurately tuned. Due to the tuning, steep filter skirt and bandwith requirements, prior art tone distinguishing filters have been relatively expensive, particularly after including the cost of tuning them individually prior to shipment or being placed in service.

SUMMARY OF THE INVENTION

The present invention is a tone decoder which does not require the highly accurate and costly filters noted above. While a pair of filters are used for high tone and low tone frequency band separation in the present invention, these filters do not have the critical parameters noted above.

The present invention utilizes the conversion of the period of each of the received multifrequency signals to individual voltage amplitudes which corresponds thereto, then compares the voltage amplitudes with a predetermined plurality of voltage ranges. Correspondence of a voltage amplitude level with one of the ranges causes production of an output signal, signifying the presence of a particular acceptable multifrequency tone.

Since individual filters corresponding to each tone frequency are not required, cost and criticality is significantly reduced. Furthermore, since the voltage level produced corresponding to the period of each signal need only be compared with a voltage range, trimming merely consists of varying the predetermined ranges or of adjusting the amplitude of the signals applied to the comparing means, a relatively simple task. Since the multifrequency signal periods are each related to each other by a known standard factor, the voltage ranges in the comparing means can also be fixed relative to each other. Accordingly it is not necessary to trim each range. The problem and cost of trimmming is thereby considerably reduced, reducing the cost and increasing the reliability of the decoding circuit.

The advantages of the invention are obtained by providing a tone decoder comprising filter means having a frequency passband sufficient to translate a predetermined group of multifrequency signals, means responsive to the signals for providing a further signal having an amplitude which is proportional to the period of each of the signals, means for comparing the amplitude of the further signal with predetermined ranges of amplitude of a stable signal source, and means for providing individual output signals each responsive to coincidence in the comparing means of one of the further signals with one of the predetermined amplitude ranges.

In the preferred embodiment of the invention, the tone decoder is comprised of filter means for separating a group of high frequency high tone multifrequency signals and a group of low tone lower frequency multifrequency signals and a group of low tone lower frequency multifrequency signals, means for converting the periods of the high tone and low tone signals to individual voltage levels related to the periods, means for comparing the voltage levels with a plurality of predetermined voltage ranges, and means for providing individual output signals upon detection of the coincidence of the voltage levels with related individual ones of the voltage ranges.

INTRODUCTION TO THE DRAWINGS

A more detailed description of the invention will be found below, in conjunction with the following drawings, in which.

DETAILED DESCRIPTION OF THE INVENTION

Figure 1:
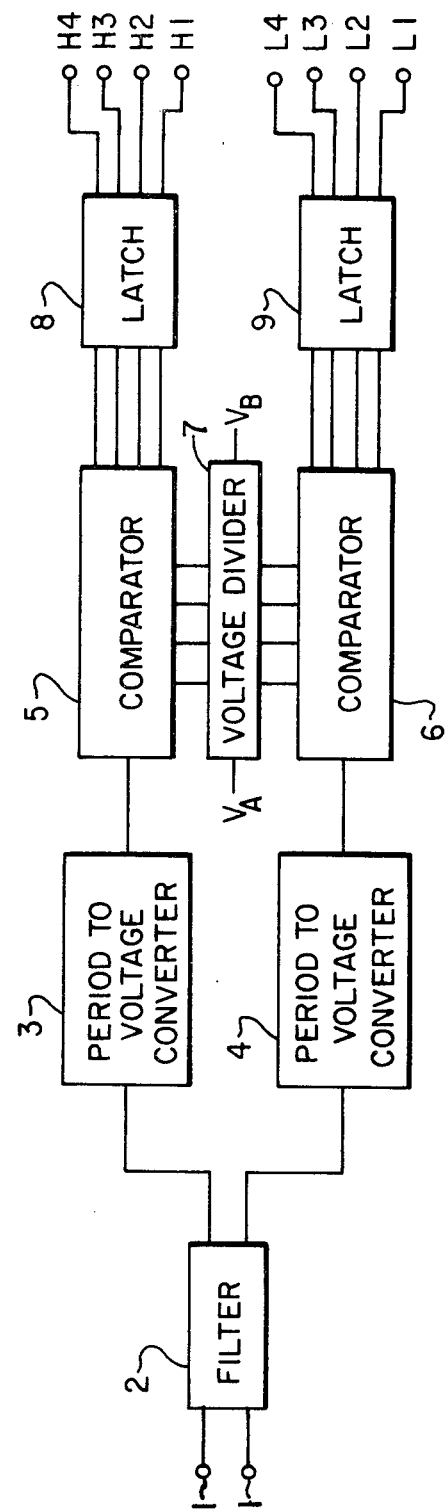
FIG. 1 is a block schematic of the invention in general form.

Turning to FIG. 1, input terminals 1 are connected to filter means 2 whereby an input signal may be applied. Filters means 2 is adapted to remove dial tone, and separates the high tone multifrequency signals and low tone multifrequency signals. The individual signals are applied to individual period to voltage converters 3 and 4. The outputs of converters 3 and 4 are connected respectively to comparators 5 and 6, which are also connected to a voltage divider 7. The output terminals of comparators 5 and 6 are connected in groups to latches 8 and 9, to which individual output terminals H1, H2, H3 and H4, and L1, L2, L3, and L4 are connected.

The multifrequency input signal is applied to filter 2, which removes dial tone, and separates the multifrequency input signals into a high frequency group and a low frequency group. The high frequency signals are applied to period to voltage converter 3, which converts the period of the input signal to a voltage level which is directly related thereto. Similarly the low frequency multifrequency signals are applied to period to voltage converter 4, where they are converted to a voltage level directly related to their periods.

The individual voltages so converted are individually applied to respective comparators 5 and 6. Comparators 5 and 6 are connected to a voltage divider which provides predetermined voltage ranges to the comparators. The comparators establish coincidence of the voltage levels from converters 3 and 4 with particular ones of the voltage ranges provided by divider 7, and in response to the coincidence with particular ranges, provide output signals on individual output leads which are connected to the input of latches 8 and 9. In response to the application of an input signal, latches 8 and 9 provide a steady output signal to one of leads H1–H4 and to one of leads L1–L4, corresponding to the original reception of a pair of individual signals within a multifrequency dialing tone.

With the provision of output signals of one of leads L1–L4 and one of leads H1–H4, it may be seen that the required decoding of the output signal has occurred without the requirement for individual critically adjusted filters.

Figure 2:
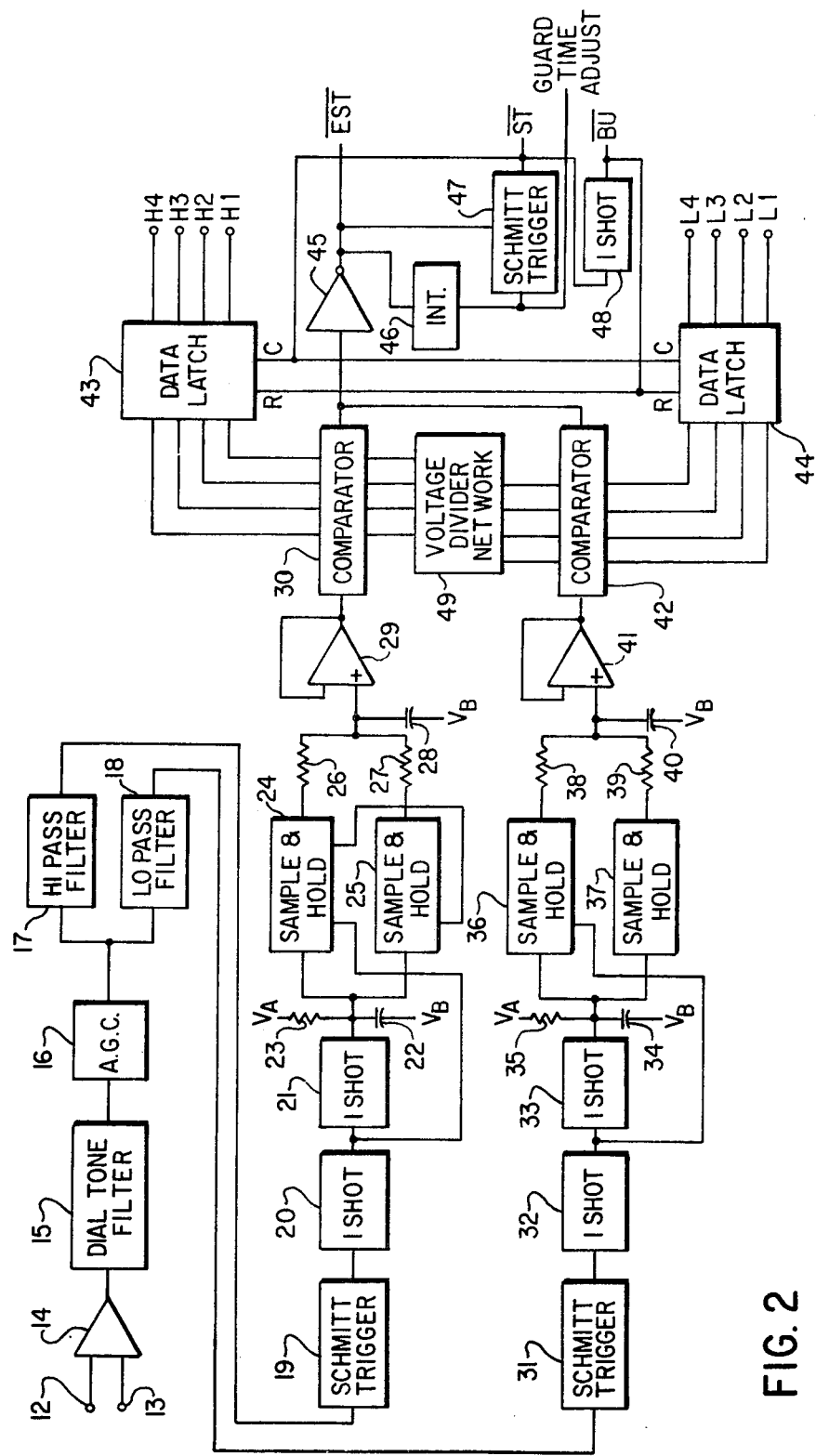
FIG. 2 is a block schematic of the preferred form of the invention, in more detail.

Turning now to FIG. 2, the preferred embodiment of the invention is shown in a more detailed block schematic form. Input terminals 12 and 13, which are intended to be connected to a telephone line carrying dialed multifrequency signals are connected to differential amplifier 14. The output of differential amplifier 14 is connected to the input of the dial tone filter 15, which has its output connected to an automatic gain control circuit 16. The output of the automatic gain control circuit is connected to the inputs of high pass filter 17 and low pass filter 18.

The outputs of the high and low pass filters are connected to two similar following circuits.

The input to Schmitt trigger 19 is connected to the output of high pass filter 17, which has its output connected to a one shot circuit 20. The output of one shot circuit 20 is connected to the input one shot circuit 21. An integrator comprising the series circuit of capacitor 22 and resistor 23 is connected at their junction to the output of one shot circuit 21. Capacitor 22 and resistor 23 are connected in series between sources potential $V_A$ and $V_B$.

The output of the integrator is connected to a pair of sample and hold circuits 24 and 25 in parallel, each of which is respectively connected in series with resistors 26 and 27, to an integrating capacitor 28 which is also connected to potential source $V_B$.

The output of one shot 20 is also connected to OR gate of sample and hold 24.

Capacitor 28 is also connected to the input of buffer 29 which has its output connected to the signal input of comparator 30.

The output of the low pass filter 18 is connected to a circuit similar to that described above. The input of Schmitt trigger 31 is connected to the output of low pass filter 18, and its own output is connected to a series circuit of one shot circuit 32, one shot circuit 33 and an integrator comprising capacitor 34 in series with resistor 35 connected between potential sources $V_A$ and $V_B$. The latter integrator is connected to a pair of sample and hold circuits 36 and 37 which respectively have resistors 38 and 39 connected in series therewith to integrating capacitor 40. Buffer 41 is connected in further series circuit to the signal input of comparator 42.

A voltage divider network 49 provides a plurality of voltage amplitude ranges, to which comparators 30 and 42 are connected. The diode outputs of comparators 30 and 42 are respectively connected to data latches 43 and 44; the outputs of latch 43 are connected to terminals H1, H2, H3 and H4, and outputs of latch 44 are connected to terminals L1, L2, L3 and L4.

An output of each of comparators 30 and 42 which is adapted to indicate the presence of a high or low tone signal is connected to inverter 45, the output of which is connected to an $\overline{EST}$ lead. The output of inverter 45 is also connected to an integrator 46, the output of which is connected, with the output of inverter 45, to the comparing input of a Schmitt trigger, the output of which is connected to the $\overline{ST}$ lead. The output of the integrator 46 is also connected to a GUARD TIME ADJUST lead.

The output of Schmitt trigger 47 is also connected to one shot circuit 48, the output of which is connected to a $\overline{BU}$ lead. This lead is also connected to the reset input of data latches 43 and 44, while the $\overline{ST}$ lead is connected to the clock inputs of data latches 43 and 44.

In operation, input terminals 12 and 13 are connected to a telephone line; the multifrequency tone signals are received and translated by differential amplifier 14. The output signal from amplifier 14 passes through dial tone filter 15, which is preferably an extremely sharp cut off dial tone rejection filter at 550–600 hertz.

The remaining multifrequency tone signals are operated upon by the automatic gain control circuit 16, and rendered of equal amplitude. The signals are applied to filters 17 and 18 which separate the higher frequency high tone group of multifrequency signals from the lower frequency low tone group.

The high tone signals are applied to Schmitt trigger 19, the output of which is a square wave having a period equal to the period of the input signal.

The square wave is then applied to one shot 20, which responsively provides pulses of preferably 15 to 25 microseconds. The output pulses of one shot 20 are applied to the input of one shot 21, which responsively provides output pulses preferably of 4 to 6 microseconds. It is preferred that the circuit be adapted to insert a 2 to 3 microsecond gap between the pulses.

The output signal of one shot 21 is integrated by capacitor 22, and is applied in to both sample and hold circuits 24 and 25. Sample and hold circuit 24 is enabled by the output of one shot 20, and sample and hold 25 is enabled at the beginning of the enabling by one shot 20, but is cut off after a few pulses (for example 3 pulses, by circuitry which is not shown in this figure but will be described in more detail with respect to FIGS. 4 and 5.

The resulting output signals of sample and hold circuits 24 and 25 are integrated in capacitor 28 to a relatively constant level directly dependent on the period of the input signal, after a rapid buildup. This signal is passed through buffer 29 to the input of comparator 30.

The low tone signal is also applied to circuitry similar to that noted above: Schmitt trigger 31, one shots 32 and 33, integrating capacitor 34, and sample and hold circuits 36 and 37 as well as integrating capacitor 40, buffer 41 and comparator 42. Accordingly, it will be noted that upon receipt of a simultaneous high and low tone sine wave signal on the telephone line, an unidirectional polarity relatively constant voltage is applied to the inputs of comparators 30 and 42, the amplitude of the signal input applied to comparator 30 being directly related to the period of the high tone signal, and the amplitude of the signal input applied to comparator 42 being directly related to the period of the low tone signal.

Voltage divider network 49 provides a plurality of voltage ranges. Comparators 30 and 42 compare the average input signal levels with the various voltage ranges of network 49, and provide output signals on one of their output leads upon the coincidence of the input signals with one of the voltage ranges. The output signals are applied to data latches 43 and 44, which apply corresponding output signals on one of leads H1–H4 and one of leads L1–L4 at a predetermined constant level.

Comparators 30 and 42 also provide outputs indicative of the presence of any tones. These are applied through inverter 45 to an $\overline{\text{EST}}$ (early steering) lead. This signal is integrated and compared with the signal on the $\overline{\text{EST}}$ lead in Schmitt trigger 47 to provide a signal on the $\overline{\text{ST}}$ (steering) lead. The leading (falling) edge of the signal on the $\overline{\text{ST}}$ lead normally appears preferably 32 milliseconds after the beginning of tone, and is used to clock the data into latches 43 and 44. The trailing (rising) edge of the signal on the $\overline{\text{ST}}$ lead preferably occurs 26 milliseconds after the end of the tone and causes operation of a 2–4 millisecond one shot 48, which generates a signal on the $\overline{\text{BU}}$ (buttons up) lead.

The reset inputs of latchs 43 and 44 are loosely coupled to the $\overline{\text{BU}}$ lead in order that the data should cease being applied to the H1–H4 and L1–L4 leads with the appearance of a signal on the $\overline{\text{ST}}$ lead. This may be overridden by driving the latch reset inputs with a low impedance. The input of Schmitt trigger 47 also is connected to the GUARD TIME ADJUST lead.

The operation of the voltage divider network will be described in more detail below with respect to FIG. 3.

The voltage divider network 49 of FIG. 2 is comprised of resistors 50A, 50B, 50C, 50D, 50E, 50F, 50G, 50H, and 50I, which are connected in series between a source of potential $V_A$ and source of potential $V_B$.

A plurality of comparators 51A–51H have one of each of their inputs connected respectively to the junctions of resistors 50A–50I; the non-inverting input of comparator 51A is connected to the junction of resistors 50A and 50B, the inverting input of comparator 51B is connected to the junction of resistors 50B and 50C, the non-inverting input of comparator 51C is connected to the junction of resistors 50C and 50D, the inverting input of comparator 51D is connected to the junction of resistors 50D and 50E, etc.

The output of buffer 29 is connected in common to the inverting inputs of comparators 51A, 51C, 51E, and 51G, and to the non-inverting inputs of comparators 51B, 51D, 51F, and 51H.

The output of comparators 51A and 51B are connected to respective inputs of AND gate 52A, the outputs of comparators 51C and 51D are connected to respective inputs of AND gate 52B, the outputs of comparators 51E and 51F are connected to respective inputs of AND gate 52C, and the outputs of comparators 51G and 51H are connected to the respective inputs of AND gate 52D.

The outputs of AND gates 52A–52D are connected to respective inputs of OR gate 53, and the output of OR gate 53 is connected in a circuit to the $\overline{\text{EST}}$ lead as will be described in more detail with FIGS. 4 and 5. The output leads of AND gates 52A–52D are connected to latch 43, as was described with reference to FIG. 2.

Similarly, comparators 54A–54H have sequentially alternate non-inverting and inverting inputs connected to the sequence of junctions between resistors 50A–50I, in a similar manner as comparators 51A–51H. Similarly, the individual inputs of AND gate 55A are connected to the respective outputs of comparators 54A and 54B, the individual inputs of AND gate 55B are connected to the respective outputs of comparators 54C and 54D, the individual inputs of AND gate 55C are connected to the respective outputs of comparators 54E and 54F, and the individual inputs of AND gate 55D are connected to the respective outputs of comparators 54G and 54H.

The outputs of AND gates 55A–55D are connected to the inputs of OR gate 56 and also to the inputs of latch 44. The output leads of latch 44 are designated L1–L4 as described earlier, and the output circuit of OR gate 56 will be described in more detail below.

The remaining inputs to comparators 54A–54H are connected together to the output of buffer 41.

The comparator circuit as a whole is outlined by a dashed line, designated as reference numeral 57, and will be shown as a block referenced as such in the schematic diagram to be described in detail below.

In operation, each of the alternate polarity-connected comparators 51A and 51B are connected across a resistor which provides a voltage division. The relatively constant unipolar input signal is applied from buffer 29 to one of the inputs of the comparators. If the input signal amplitude is above the voltage at the junction of resistors 50A and 50B, an output signal appears from comparator 51A. If the input signal is below the level at the junction of resistors 50B and 50C, an output signal appears from comparator 51B. Accordingly a voltage range is established, and if the input signal is within this range, both comparators 51A and 51B have output signals therefrom. The signals are applied to AND gate 52A, which provides an output signal when both inputs signals are present.

Comparators 51C with 51D operate similarly as comparators 51A with 51B, as do comparators 51E with 51F, 51G with 51H, 54A with 54B, 54C with 54D, 54E with 54F, and 54G with 54H.

With the input signal at a voltage level within the range which gives rise to both input signals to AND gate 52A, an output signal therefrom will be present; similarly output signals occur at different input signal-levels from AND gates 52B, 52C, and 52D, and similarly output signals occur as a result of receipt of input signals within similar ranges from AND gates 55A, 55B, 55C and 55D, the latter group of output signals occurring with the inputting of low frequency tones and the former group of output signals occuring with the inputting of high frequency tones.

The output signals of the AND gates noted above are applied to respective latches 43 and 44, as well as to respective OR gates 53 and 56. With the presence of a signal at the output of one of AND gates 52A–52D, the OR gate provides an output signal. Similarly with the output of a signal from one of AND gates 55A–55D an output signal is produced from OR gate 56.

In this manner a relatively constant single polarity voltage level which had been produced corresponding to the period of each of the high and low frequency tones causes an output signal to appear on one of the leads of terminals H1–H4 and terminals L1–L4. In addition, an indication appears at the output of OR gate 53 and OR gate 56 as to the reception of a high tone and a low tone multifrequency signal.

A detailed description of the invention will now be made with reference to FIGS. 4–7.

Figure 4:
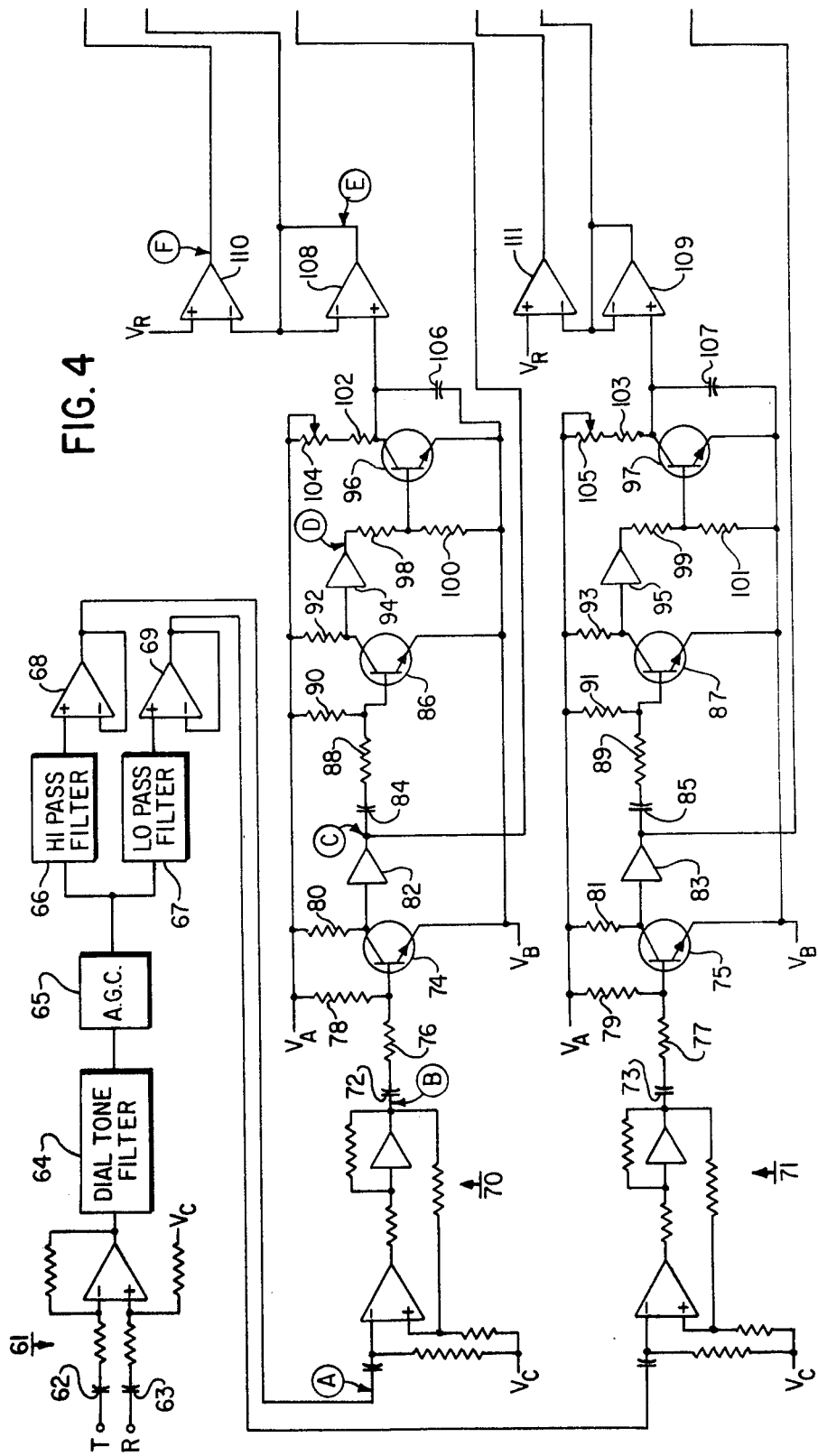
Figure 5:
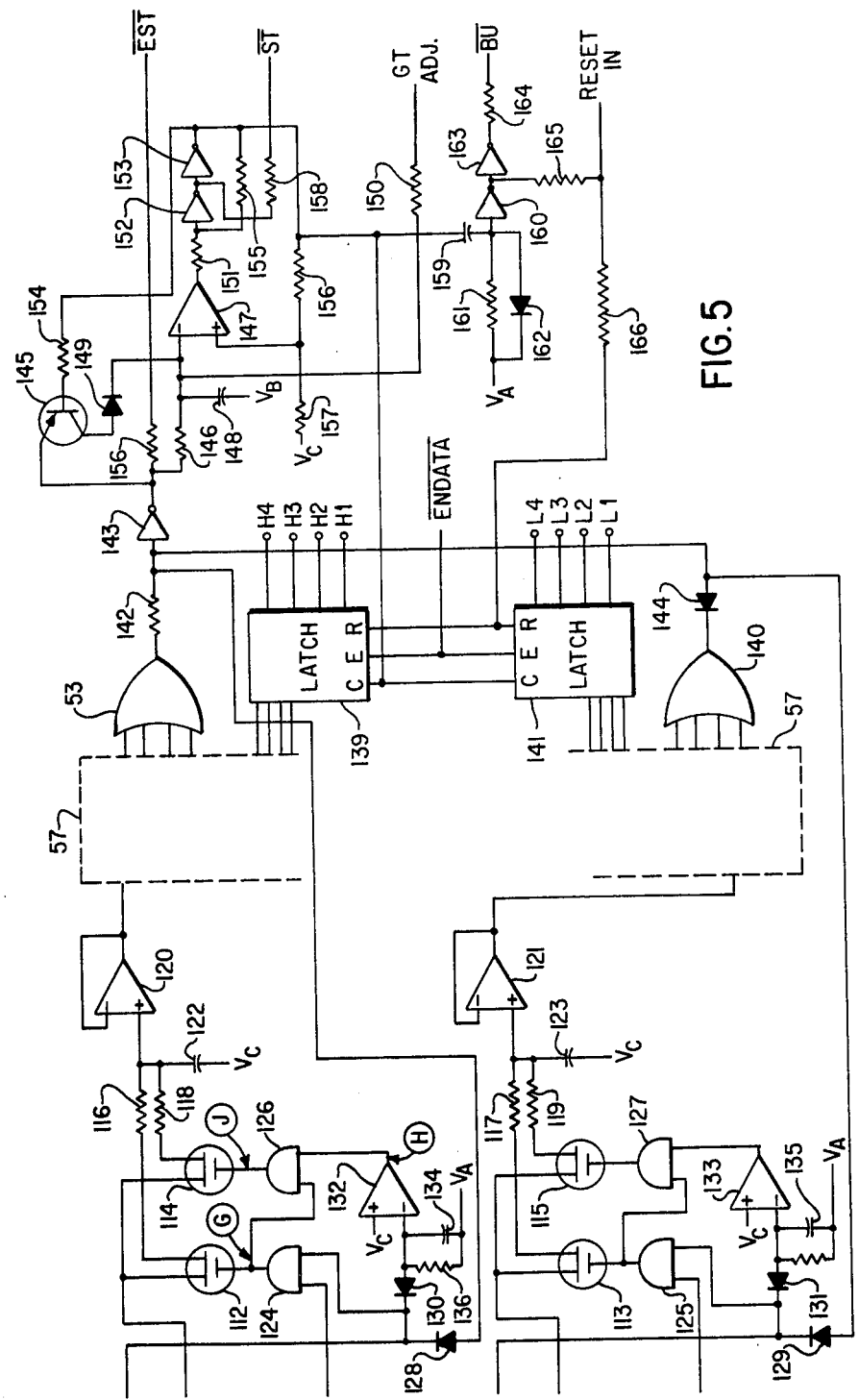

Turning now to FIGS. 4 and 5, the preferred embodiment of the invention is shown as a schematic diagram, partly in block form. A conventional differential amplifier 61 is DC isolated by means of capacitors 62 and 63 connected in its input circuit, for connection across the tip and ring leads of a telephone line. Input terminals to the differential amplifier circuit are referenced T and R.

The output of differential amplifier circuit 61 is connected to the input of a dial tone rejection filter 64. This filter preferably is a high pass filter, constructed as a well known fifth order elliptical high pass filter, having a sharp cutoff at 550–600 hertz. Since dial tone signals are typically below this frequency, substantially only those signals above this frequency are passed through.

The output of dial tone rejection filter 64 is connected to an automatic gain control circuit 65, the construction of which is assumed known to a person skilled in the art. The output signal level of the automatic gain control circuit in a successful prototype was about 4 volts peak-to-peak, to provide a relatively large signal level to the following stages, but which was not so high as to cause distortion.

The output of the automatic gain control circuit 65 is connected to the inputs of a pair of filters connected in parallel, a high pass filter 66 and a low pass filter 67. The cutoff frequency of filters 66 and 67 should be at approximately 1100 hertz, in order to separate the standard low tone frequencies of 697 hertz, 770 hertz, 852 hertz, and 941 hertz from the standard high tone frequencies of 1209 hertz, 1336 hertz, 1477 hertz and 1633 hertz. Each of the filters is preferably of the same form as dial tone filter 64, the low pass filter of course being of low pass type. High tone signals thus pass through the high pass filter 66, and low tone signals thus pass through the low pass filter 67.

The output of high pass filter 66 is connected to the input of buffer 68 and the output of low pass filter 67 is connected to the input of buffer 69. The output of each of the buffers is connected to similar period to voltage conversion and sample and hold circuits as will be described below.

Since the circuits are similar, both will not be described in detail. The high tone converting circuit will be described with reference to the unbracketed reference numerals, and the bracketed reference numerals refer to the corresponding similar low tone original converting circuit.

The output of buffer 68 (69) is connected to the input of a Schmitt trigger 70 (71), the input of which is at the location noted as "A", and the output of which is noted as "B". The output of the Schmitt trigger is connected via capacitor 72 (73) to a transistor one-shot comprising NPN transistor 74 (75) having its base connected through resistor 76 (77) to capacitor 72(73) and also through resistor 78 (79) to source of potential $V_A$. The collector is also connected through resistor 80 (81) to source of potential $V_A$. The emitter of transistor 74 (75) is connected to source of potential $V_B$.

The collector of the transistor is connected through buffer 82 (83) to a second one-shot circuit through capacitor 84 (85). While the first one-shot provides pulses preferably of between 15 and 25 microseconds long, the second one-shot provides pulses preferably of between 4 and 6 microseconds long.

The second one-shot is comprised of NPN transistor 86 (87) having its base connected to capacitor 84 (85) through resistor 88 (89), and to source of potential $V_A$ through resistor 90 (91). Its collector is also connected to source of potential $V_A$ through resistor 92 (93), and its emitter is connected to the source of potential $V_B$.

The collector of transistor 86 (87) is connected to the input of a buffer 94 (95) which has its output connected to the base of an NPN transistor 96 (97) through resistor 98 (99). The base of transistor 96 (97) is also connected to source of potential $V_B$ through resistor 100 (101). The emitter of transistor 96 (97) is connected to source of potential $V_B$.

The collector of transistor 96 (97) is connected to source of potential $V_A$ through the series circuit of resistor 102 (103) and potentiometer 104 (105). The collector is also connected to source of potential $V_B$ through capacitor 106 (107), and is also connected to the non-inverting input of operational amplifier 108 (109). The output of operational amplifier 108 (109) is connected to its inverting input, which is also connected to the inverting input of operational amplifier 110 (111).

Turning now to FIG. 5, the output of operational amplifier 108 (109) is connected to the source of each of a pair of FET analog switches 112 (113) and 114 (115). The drains are connected together through individual resistors 116 (117) and 118 (119), and to the non-inverting input of buffer 120 (121). The noninverting input of buffer 120 (121) is connected to a source of potential $V_C$ through capacitor 122(123).

The output of buffer 82 (83) (FIG. 4) is connected to one input of AND gate 124 (125), which is connected to the gate of analog switch 112 (113), as well as to one input of AND gate 126 (127).

The output of operational amplifier 110 (111) is connected to the second input of AND gate 124 (125), as well as to the cathode terminals of a pair of diodes 128 (129) and 130 (131). The anode of diode 130 (131) is connected to the inverting input of operational amplifier 132 (133), and the output of operational amplifier 132 (133) is connected to the second input of AND gate 126 (127). The inverting input of operational amplifier 132 (133) is also connected to source of potential $V_A$ through the parallel circuit of capacitor 134 (135) and resistor 136 (137).

Figure 6:
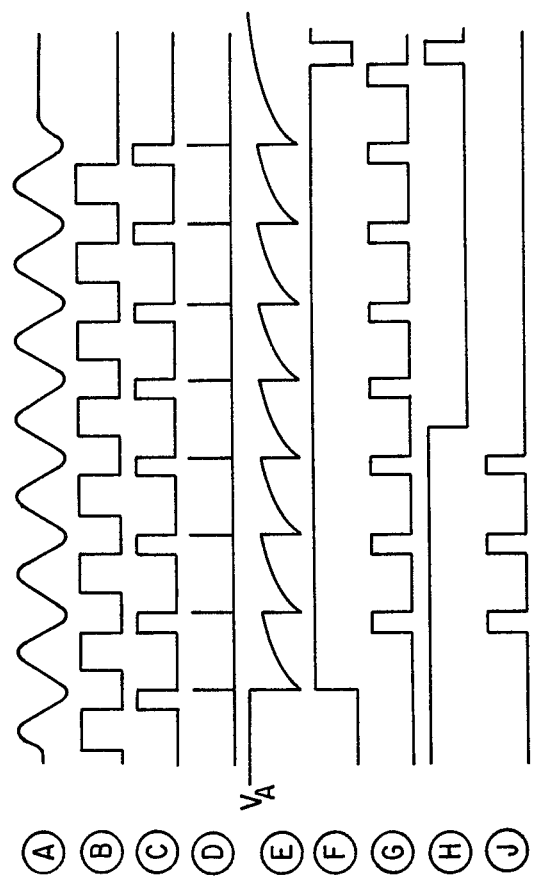

It will be noted that certain nodes in FIGS. 4 and 5 are designated by circled letters A–J. FIG. 6 depicts similarly referenced waveforms, which are found noted at the designated nodes.

Figure 3:
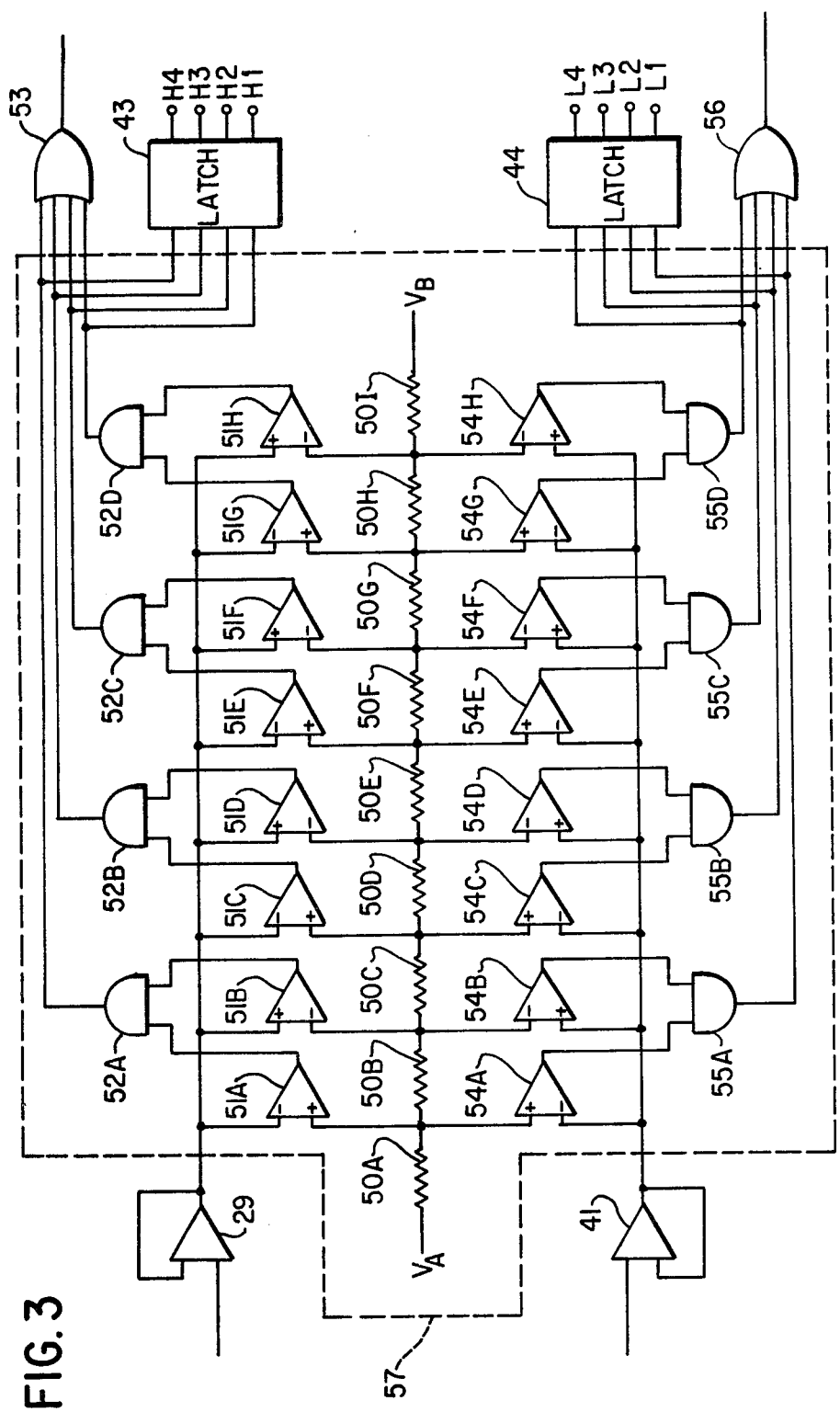
FIG. 3 is a schematic diagram of the comparator portion of the invention, FIGS. 4 and 5 form a schematic diagram of the preferred form of invention, FIG. 6, A–J, is a waveform diagram of signals at various locations in the circuit.

The output of operational amplifier 120 (short circuited to its inverting input) is the same element as buffer 29 shown in FIG. 3, and similarly operational amplifier 121 is the same element as buffer 41 of FIG. 3. The latter outputs are connected to comparator 57, shown as a broken dashed dash line block in FIG. 5, but which is identical to the schematic diagram shown in FIG. 3.

The four high tone outputs are connected in parallel to OR gate 53 and to latch 139. Similarly, the four low tone outputs shown in FIG. 3 are connected in parallel to OR gate 140 and to latch 141. Latches 139 and 141 correspond to latches 43 and 44 respectively in FIG. 3.

The outputs of latch 139 are connected to terminals H1, H2, H3, and H4, while the similar outputs of latch 141 are connected to terminals L1, L2, L3, and L4. Each latch also includes a clock input (C), a reset input (R), and an enable input (E).

The output of OR gate 53 is connected through resistor 142 to the input of inverter 143, and the output of OR gate 140 is connected to the cathode of diode 144. The anodes of diodes 129 and 144 are connected together, to the input of inverter 143.

The output of inverter 143 is connected through resistor 156 to the $\overline{\text{EST}}$ lead, and to the emitter of a PNP transistor 145. It is also connected through resistor 146 to the inverting input of operational amplifier 147, and to one terminal of capacitor 148, the other terminal of which is connected to source of potential $V_B$. The collector of transistor 145 is connected through diode 149 to the inverting input of operational amplifier 147, which input is also connected through resistor 150 to the GT ADJ (Guard Time Adjust) lead.

The output of operational amplifier 147 is connected through resistor 151 to the input of inverter 152, the output of which is connected to the input of inverter 153. The output of inverter 153 is connected through resistor 154 to the base of transistor 145, through resistor 155 to the input of inverter 152, and through series resistors 156 and 157 to source of potential $V_C$. The junction between resistors 156 and 157 is connected to the noninverting input of operational amplifier 147. The junction between inverters 152 and 153 is connected through resistor 158 to the $\overline{ST}$ lead.

The output of inverter 153 is connected to the clock (C) inputs of latches 139 and 141, and also through capacitor 159 to the input of inverter 160. The input of inverter 160 is connected to source of potential $V_A$ through the parallel circuit of resistor 161 and diode 162.

The output of inverter 160 is connected to the input of inverter 163, which has its output connected to the $\overline{BU}$ and LEAD through resistor 164. The junction between inverters 160 and 163 is connected to the RESET IN lead through resistor 165, and to the reset (R) terminals of latches 139 and 141 through resistor 166. The enable inputs of latches 139 and 141 are both connected to the $\overline{ENDATA}$ lead.

Operation of the above circuit is as follows. AC signals carried by the tip and ring leads of the telephone line are coupled to differential amplier circuit 61, where they are translated and passed to dial tone rejection filter 64. All signals at a frequency less than about 550 hertz, which includes dial tone signals, ringing signals, etc. are stopped, and signals of higher frequency are passed through to automatic gain control circuit 65. In this circuit the applied signals are all rendered of equal amplitude, and are applied to filters 66 and 67. Multifrequency signals of higher frequency than about 1100 hertz pass through high pass filter 66 and are translated through buffer 68. Multifrequency signals of between 550 hertz and 1100 hertz are passed through low pass filter 67 and translated through buffer 69.

The resulting high and low tone sine wave signals are applied to respective Schmitt triggers 70 and 71. Since the circuit following the Schmitt trigger operating upon the low tone signal operates similarly to the circuit operating on the high tone signal, a specific description of the operation of the latter will not be given. Reference is made to FIG. 6 which shows waveform diagrams of signals at the locations of the circled letters on the Schematic diagram.

The Schmitt trigger 70 converts the input sine wave to a square waveform, the input sine wave signal at A being converted to the square wave at (FIG. 6) B. The one shot circuit including transistor 74 receives the square wave signal and at the trailing edge of each square wave produces a pulse signal at C of 15 to 25 microseconds. This signal is applied to the one shot circuit including transistor 86, which produces an output signal at D at the time of the trailing edge of the C. The latter output signal is of the form of square waves of 4-6 microsecond. Pull-up resistor 92 (eg. of 100 k ohms) produces a 2-3 microscond gap between the trailing edge of waveform C and the leading edge of waveform D.

The resulting pulses operate transistor 96, which forms a discharge path for charge held by capacitor 106. The capacitor current charge path is through resistors 102 and potentiometer 104; potentiometer 104 adjusts the average level to which the capacitor is charged. The result, at the output of operational amplifier 108 is a sawtooth waveform shown at E; the capacitor discharges each time a pulse from the last-described one-shot causes transistor 96 to conduct. It may be seen that the peak amplitude of the sawtooth waveform E in FIG. 6 is less than potential $V_A$, to which the capacitor was originally charged prior to arrival of the discharge pulses.

The output signal from buffer 108 is applied to operational amplifier 110, which conducts inversely to operational amplifier 108; that is, a long pulse appears at node F upon buffer 108 conducting and applying to the inverting input of operational amplifier 110 a predetermined potential which is below a predetermined threshold voltage level set by source $V_R$. The resulting conduction period of operational amplifier 110 is shown as waveform F in FIG. 6, and terminates upon the potential across capacitor 106 exceeding the aforenoted predetermined threshold.

The long pulse output signal of operational amplifier 110 is applied to one input of AND gate 124, and in inverse through operational amplifier 132, to one input of AND gate 126. The other input of AND gate 124 receives pulsing signals of the form of waveform C from the output of buffer 82. Accordingly after the beginning of conduction of operational amplifier 110, which itself occurs after the completion of the first pulse of waveform C, AND gate 124 operates in synchronism with waveform C. The result at the output of AND gate 124 may be seen as waveform G.

Operational amplifier 132 is normally conductive, and therefore provides a high level input to one input of AND gate 126. Upon receipt at its inverting input of the beginning of waveform F from the output of operational amplifier 110, capacitor 134 begins charging. Once it has charged, a signal of waveform F is available at the inverting input of operational amplifier 132, causing operational amplifier 132 to cut off.

The second input of AND gate 126 receives output signals from AND gate 124, which, as noted eariler, is of the form of waveform G. Accordingly AND gate 126 is enabled in synchronism with the pulses of waveform G during the period that operational amplifier 132 is conductive, that is, during the period that capacitor 134 is charging. The operational period of operational amplifier 132 is shown as waveform H in FIG. 6, and the resulting output signal of AND gate 126 is shown as waveform J. The time between the leading edge of waveform F and the trailing edge of waveform H is a portion of the charge time period of capacitor 134.

Accordingly FET gate 112 is pulsed on in sychronism with waveform G, and FET gate 114 is pulsed on in sychronism with waveform J.

Both gates conduct the output current of waveform E from inverter 108. This current charges capacitor 122. The result at the output of buffer 120 is a signal rising in steps to a voltage level determined by the time of presence of the pulses of waveform J, which voltage level is then maintained as a castellated signal having a certain average level. It is the latter average level signal which is applied to and compared in comparator 57, the operation of which was described with reference to FIG. 3.

Turning briefly to FIG. 3, let us assume that the average voltage level applied at the output of buffer 120 (ie. buffer 29 in FIG. 3) is within the potential range at the terminals across resistor 50D. Both of comparators 51C and 51D will conduct (and none of the other 51A–51H comparators), causing operation of AND gate 52B and a resulting input signal applied to OR gate 53. The signal at the output of AND gate 52B is also applied to latch 43 (ie. 139 in FIG. 5).

Returning to FIG. 5, the latch, once enabled, applies a constant level signal to one of leads H1–H4. Accordingly the high tone multifrequency signal has been decoded to a $\frac{1}{4}$ output signal.

Similarly, a low tone multifrequency signal is decoded to a $\frac{1}{4}$ output signal.

The presence of an input signal to OR gate 53 causes an output signal to pass through inverter 143 and the be applied to the $\overline{EST}$ lead. This logic signal indicates that a valid tone has been detected.

The output signal of inverter 143 is also integrated in capacitor 148, and is applied to a Schmitt trigger which includes operational amplifier 147 and inverter 152. The resulting output signal is applied to the $\overline{ST}$ (steering) lead. This signal is inverted in inverter 153 and is applied to the input of a latter Schmitt trigger, as well as to the base input of transistor 145. Diode 149 and the emitter-collector circuit of transistor 145 thus conduct, short circuiting resistor 146 for voltage in excess of the operation voltage of the diode and transistor during the operational period of the Schmitt trigger. The result is a slow charge and fast discharge of capacitor 148.

The output signal of inverter 153 is applied to the clock input of latches 139 and 141. Due to the delay based on the charging time of capacitor 148, typically of 32 milliseconds, the clock pulse to latches 139 and 141 occurs 32 milliseconds after the beginning of tone. Accordingly the outputs on one of leads H1–H4 and also on one of leads L1–L4 occurs at that time, providing final decoder output signals thereto.

The trailing (rising) signal applied on the $\overline{ST}$ lead preferably occurs at 26 milliseconds after the end of tone. This signal is applied to a oneshot circuit through capacitor 159 comprising inverter 160, which generates a pulse on the $\overline{BU}$ (buttons up) lead. This indicates the end of tone, and is applied to the reset inputs of latches 139 and 141. This serves to clear the data from the latches, removing signals from leads H1–H4 and L1–L4. The reset time can be externally set by applying an input signal on the RESET IN lead.

It may be seen that the signal at the output of operational amplifier 120 climbs rapidly to a certain average level, the level being directly related to the period of the sine wave input signal, since this period determines the spacing of the one-shot pulses of waveform D.

It will be noted that a purpose of FET gate 114 which provides charging pulses to capacitor 122 during the early sampling period is to cause a very rapid climb of the voltage to the sampling range. The output of buffer 120 thereafter follows the filtered signal from node E, thereby eliminating the effect of period jitter.

One may therefore characterize the functions of each of the gates 112 and 114 with capacitor 122 as parallel sample and hold circuits, gate 112 sampling for the entire signalling period and gate 114 sampling for only the first few cycles. The average voltage is held on capacitor 122.

It should be noted that in the event a period is less than 1.2 milliseconds in the high frequency group of multifrequency signals (2 milliseconds in a low frequency group of multifrequency signals) the signal is treated as interrupted, and the square wave corresponding to the input signal stops for over two milliseconds. The signal F thereby goes to low voltage level, which prevents a sample from being taken. This is desirable since if a sample were taken, the voltage on capacitor 106 would be upset for several milliseconds thereafter.

By applying a high level signal to the $\overline{ENDATA}$ lead, the signals on the H1–H4 and L1–L4 leads may be made tristate.

It should be noted that the DC voltage which is applied to comparators 51A–51H and 54A–54H represents the average period of each of the two multifrequency input signals. As noted earlier, this voltage is compared to 8 discrete voltage ranges which are generated by the voltage divider comprising resistors 50A–50I. These ranges represent the windows of acceptance for the four multifrequency tones in each of the high and low frequency groups. The windows of acceptance are preferably linearly divided. However the DC voltage receives from the sample and hold circuits an applied signal from buffers 120 and 121 (29 and 41 in FIG. 3) which are proportional to the logarithm of the period. Since the multifrequency tones are standarized as exponentially distributed, this cancels against the logarithmic factor.

Trimming is effected by setting the output signals of the sample and hold circuits above and below a median voltage $V_C$ which is midway between voltages $V_A$ and $V_B$ OF the voltage divider. An example of a rule which has been successfully used is for the sample and hold output voltage to change by 50 millivolts for a 1 percent change in frequency; for example, since the two frequencies represented by H2 and H3 are 10 percent apart, this would give rise to a 500 millivolt change in potential, or ±250 millivolts about $V_C$.

The sample and hold output voltage applied to the comparators may be set by varying potentiometer 104 (105) whereby the average voltage on capacitor 106 (107) is set. The entire range above or below the central voltage $V_C$ may thus be adjusted.

Figure 7:
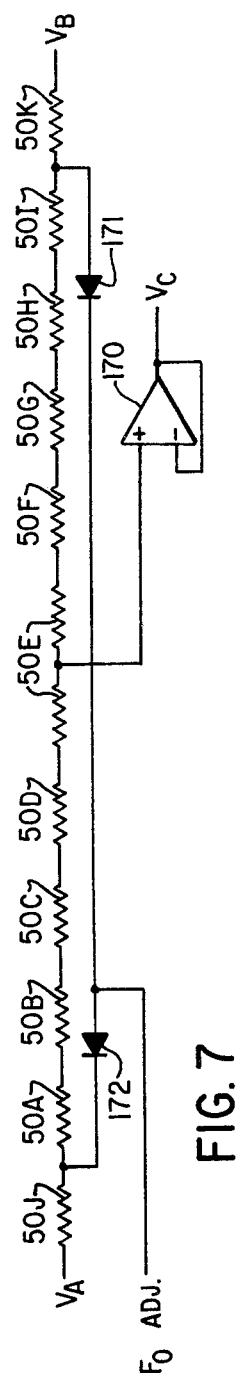
FIG. 7 is a detail of a portion of the schematic diagram of FIG. 3.

The voltage $V_C$ may be set by providing the voltag divider circuit of FIG. 3 according to the circuit of FIG. 7. In this case resistor 50E is split into two equal valued parts and the junction therebetween is connected to a buffer 170. The output of the buffer provides potential $V_C$ for the remainder of the circuit as noted earlier.

Resistor 50A is connected to source $V_A$ through a small valued resistor 50J, and resistor 50I is connected to source of potential $V_B$ through small valued resistor 50K which is equal in value to resistor 50J. The junction between resistors 50I and 50K is connected through diode 171 to a $F_0$ ADJ lead, which lead is also connected through diode 172 to the junction between resistors 50J and 50A. An external control may be connected to the $F_0$ ADJ lead to further trim and adjust the range between sources $V_A$ and $V_B$. The exact potential set between the potential sources of $V_A$ and $V_B$, that is, at the junction between the two portions of resistor 50E is potential $V_C$ above and below which the average signal potentials for comparison are thus adjusted accurately.

It had been noted earlier that the outputs of OR gates 140 and 53 are applied to the input of an inverter 143. The outputs are applied to two of the inputs of a four input AND gate, the two inputs formed of resistor 142 and diode 144. The remaining two inputs are connected to threshold circuits through diodes 128 and 129. The purpose of connection to the threshold circuits is to apply the F signal from both the high and low frequency group processing circuits to the inverter 143. Should this have not been done, the sample and hold voltage would have been constantly applied from the last sample. The application of the F signal causes termination of the signal through the inverter 143. The resulting output signal from the AND gate formed of aforenoted diodes 128, 129, 144 and resistor 142 is inverted and forms the signal on the $\overline{\text{EST}}$ lead.

Accordingly, the present invention has provided decoding of a 2/8 multifrequency signal without the requirement of expensive individual tone filters which had to be carefully adjusted during manufacture. Trimming is easily done by a single control for the high frequency group and a single control for the low frequency group. In addition, a logic signal is provided on an $\overline{\text{EST}}$ lead which indicates that a valid tone has been detected. A second logic signal on the $\overline{\text{ST}}$ lead is generated and data is latched once a period after the presence of a tone has been exceeded. A third signal on the $\overline{\text{BU}}$ lead indicates the end of the presence of tone, and is used to clear the data from the data latches. The guard time and center frequencies of the filters may be adjusted externally, and an external reset control and a lead for making the data output tristate is also provided.

A person understanding this invention may now conceive of modifications or other embodiments. All are considered within the sphere and scope of the present invention as defined in the claims appended hereto.

We claim:

1. A tone decoder comprising:
 (a) filter means for separating a group of high tone multifrequency signals and a group of low tone multifrequency signals,
 (b) means for converting the period of the high tone and low tone signals to individual voltage levels relating to said periods, including means for generating first and second square wave signals in phase with each of the high tone and low tone signals respectively, first and second integrating means for integrating each of the corresponding square waves, means for sampling the integrated signal to form said voltage levels,
 (c) means for comparing said voltage levels with a plurality of predetermined voltage ranges, and
 (d) means for providing individual output signals upon coincidence of said voltage levels with related individual ones of the voltage ranges.

2. A tone decoder comprising:
 (a) filter means having a frequency band such as to translate a predetermined group of multifrequency signalling input signals,
 (b) means for converting said input signals into square wave signals having the same frequency as said input signals,
 (c) means for integrating the square wave signals,
 (d) means for sampling and holding the integrated square wave signals to form further signals having voltage levels related to the periods of said input signals,
 (e) means for comparing the amplitudes of the further signals with predetermined voltage ranges, and
 (f) means for providing, at particular terminals, individual output signals each responsive to coincidence in the comparing means of one of said further signals with one of said predetermined amplitude ranges.

3. A tone decoder as defined in claim 2, further including a latch connected to each said terminal of said comparing means, and for providing a continuing D.C. signal on one of a plurality of output terminals upon provision of an output signal from the comparing means.

4. A tone decoder as defined in claim 2 in which the further signal is of single polarity, and the comparing means includes a d.c. voltage divider including means for establishing ranges of d.c. voltages for comparison of said further signal therewith.

5. A tone decoder as defined in claim 4 in which the filter means includes means for separating and passing a low frequency and a high frequency range of multifrequency signalling signals; and further including means for providing a pair of single polarity signals proportional to the periods of the multifrequency signalling signals, one in the high frequency range and one in the low frequency range; the comparing means including means for comparing each of the pair of signals with said ranges of D.C. voltage.

6. A tone decoder comprising:
 (a) filter means for separating a group of high tone multifrequency signals and a group of low tone multifrequency signals,
 (b) means for converting the periods of the high tone and low tone signals to individual voltage levels related to said periods, each including the series circuit of a Schmitt trigger, a first one shot circuit, a second one shot circuit and a voltage integrator,
 (c) means for comparing the voltage levels with a plurality of predetermined voltage ranges, and
 (d) means for providing individual output signals upon coincidence of the voltage levels with related individual ones of the voltage ranges.

7. A tone decoder as defined in claim 6 further including a sample and hold circuit connected between each integrator and each comparator.

8. A tone decoder as defined in claim 6 or 7 in which the filter means is comprised of means for stopping translation of dial tone frequency signals, in series circuit with a high pass filter for passing said high tone signals connected to one Schmitt trigger in parallel with a low pass filter for passing said low tone signals connected to the other Schmitt trigger.

9. A tone decoder as defined in claim 7 in which the filter means is comprised of means for stopping translation of dial tone frequency signals in series circuit with an automatic gain control circuit, and a high pass filter for passing said high tone signals connected to one Schmitt trigger in parallel with a low pass filter for passing said low tone signals connected to the other Schmitt trigger.

10. A tone decoder as defined in claim 9, in which the comparing means includes a voltage divider, means for distinguishing predetermined voltage ranges provided by the voltage divider, means for applying the output of each sample and hold circuit to one input of a corresponding group of comparators, the other input of each comparator of each group being connected to individual voltage range dividing points of said voltage divider.

11. A tone decoder as defined in claim 10, further comprising a latch circuit connected between the outputs of each group of comparators and a plurality of output terminals.

* * * * *